(12) United States Patent
MacQuin et al.

(10) Patent No.: US 9,321,513 B2
(45) Date of Patent: Apr. 26, 2016

(54) STREAMER COATING DEVICE AND METHOD

(71) Applicant: CGG SERVICES SA, Massy (FR)

(72) Inventors: Raphael MacQuin, Montrouge (FR); Sylvain Levrault, Outarville (FR)

(73) Assignee: CGG SERVICES SA, Massy (FR)

( * ) Notice: Subject to any disclaimer, the term of this patent is extended or adjusted under 35 U.S.C. 154(b) by 32 days.

(21) Appl. No.: 13/956,522

(22) Filed: Aug. 1, 2013

(65) Prior Publication Data

US 2014/0033962 A1    Feb. 6, 2014

Related U.S. Application Data

(60) Provisional application No. 61/679,141, filed on Aug. 3, 2012.

(51) Int. Cl.
*G01V 13/00* (2006.01)
*B63C 11/52* (2006.01)
*G01V 1/20* (2006.01)
*G01V 1/38* (2006.01)

(52) U.S. Cl.
CPC ............... *B63C 11/52* (2013.01); *G01V 13/00* (2013.01); *G01V 1/201* (2013.01); *G01V 1/38* (2013.01)

(58) Field of Classification Search
CPC ........................................................ B63C 11/52

USPC ............................................................ 422/28
See application file for complete search history.

(56) References Cited

U.S. PATENT DOCUMENTS

| 4,716,553 A * | 12/1987 | Dragsund et al. ............... 367/15 |
| 5,947,051 A * | 9/1999 | Geiger .................. B62D 57/00 114/222 |
| 2002/0182980 A1* | 12/2002 | Van Rompay .................. 451/28 |
| 2006/0054186 A1 | 3/2006 | Lepage et al. |
| 2008/0127875 A1* | 6/2008 | Hoogeveen et al. .......... 114/312 |
| 2008/0175097 A1* | 7/2008 | Storteig et al. .................. 367/16 |
| 2008/0192570 A1* | 8/2008 | Lennart Tenghamn ........... G01V 1/3826 367/17 |
| 2010/0307402 A1* | 12/2010 | Rinnan et al. ................. 114/243 |
| 2012/0006554 A1 | 1/2012 | Allen et al. |
| 2014/0174470 A1* | 6/2014 | Dalseide ........................... 134/6 |

OTHER PUBLICATIONS

Office Action in corresponding Singapore Application No. 2013059217 dated Apr. 13, 2015.

* cited by examiner

*Primary Examiner* — Kevin Joyner
*Assistant Examiner* — Holly Mull
(74) *Attorney, Agent, or Firm* — Patent Portfolio Builders PLLC (57) ABSTRACT

Method and device for cleaning a marine seismic equipment. The device includes a body, a propulsion system for moving along the streamer, a cleaning device for cleaning the equipment, and a control device for controlling a movement of the device.

7 Claims, 11 Drawing Sheets

1100 — Attaching a coating and/or cleaning device to the streamer

1102 — Controlling a movement of the coating and/or cleaning device along the streamer 1104 — Applying a coat of the biocide material on the streamer when the coating and/or cleaning device moves along the streamer

Figure 12

STREAMER COATING DEVICE AND METHOD

RELATED APPLICATIONS

This application is related to, and claims priority from, U.S. Provisional Patent Application No. 61/679,141, filed Aug. 3, 2012, entitled "Streamer Coating Device and Method", the disclosure of which is incorporated here by reference.

BACKGROUND

1. Technical Field

Embodiments of the subject matter disclosed herein generally relate to methods and systems and, more particularly, to mechanisms and techniques for coating and/or cleaning seismic equipment that is deployed in water or underwater.

2. Discussion of the Background

During the past years, interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys to more accurately decide where to drill in order to avoid a dry well.

Marine seismic data acquisition and processing generate a profile (image) of the geophysical structure (subsurface) under the seafloor. This profile is used by those trained in the field to evaluate the presence or absence of oil and/or gas traps. Thus, providing a high-resolution image of the subsurface is an ongoing process for the exploration of natural resources, including, among others, oil and/or gas.

Figure 1:
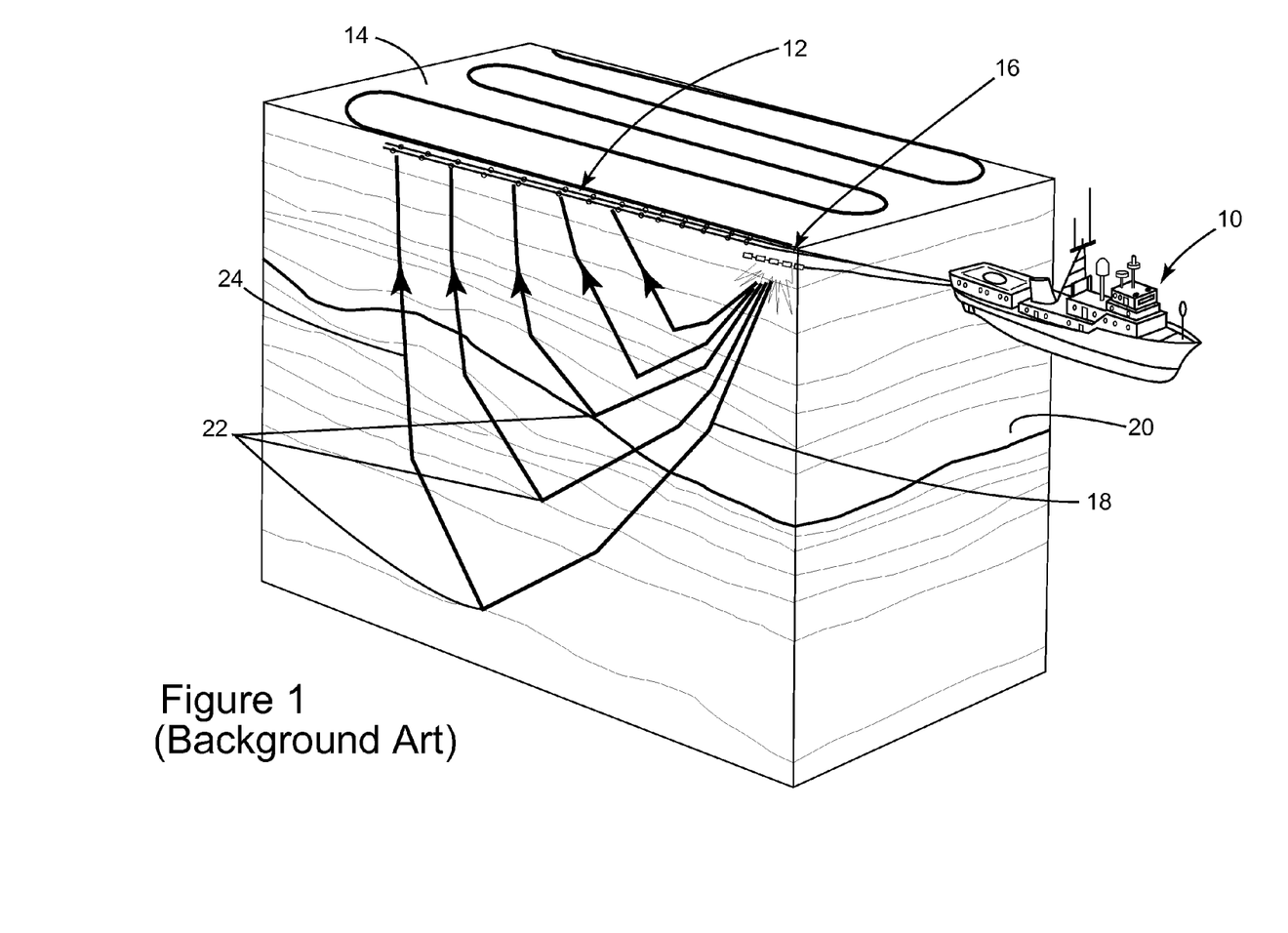
FIG. 1 is a schematic diagram of a conventional seismic data acquisition configuration.

During a seismic gathering process, as shown in FIG. 1, a vessel 10 tows an array of seismic detectors provided on streamers 12. The streamers may be disposed horizontally, i.e., lying at a constant depth relative to a surface 14 of the ocean. The vessel 10 also tows a sound source assembly 16 that is configured to generate an acoustic wave 18. The acoustic wave 18 propagates downward, toward the seafloor 20, and penetrates the seafloor until eventually a reflecting structure 22 (reflector) reflects the acoustic wave. The reflected acoustic wave 24 propagates upward until it is detected by a detector on streamer 12.

The above-noted arrangement is towed underwater for days, if not weeks, for a given survey. Thus, it was noted that various marine creatures or animals, e.g., barnacles, attach to various components of the streamer, e.g., external skin, electronic components, birds, etc. The barnacles may increase the drag on the streamer, which increase fuel consumption and may damage the equipment, or they may change the desired weight of the streamer, may make the streamer deviate from its desired towed position, may affect the recorded signal, may introduce noise or simply may make it difficult to manipulate the streamer for maintenance or when deployed underwater.

Traditional methods employ a cleaning device configured to move along the streamer and clean the streamer of marine animals. However, there are problems with these devices because they are bulky and they need to travel along various elements (e.g., birds, electronic boxes, etc.) connected to the streamer.

Figure 2:
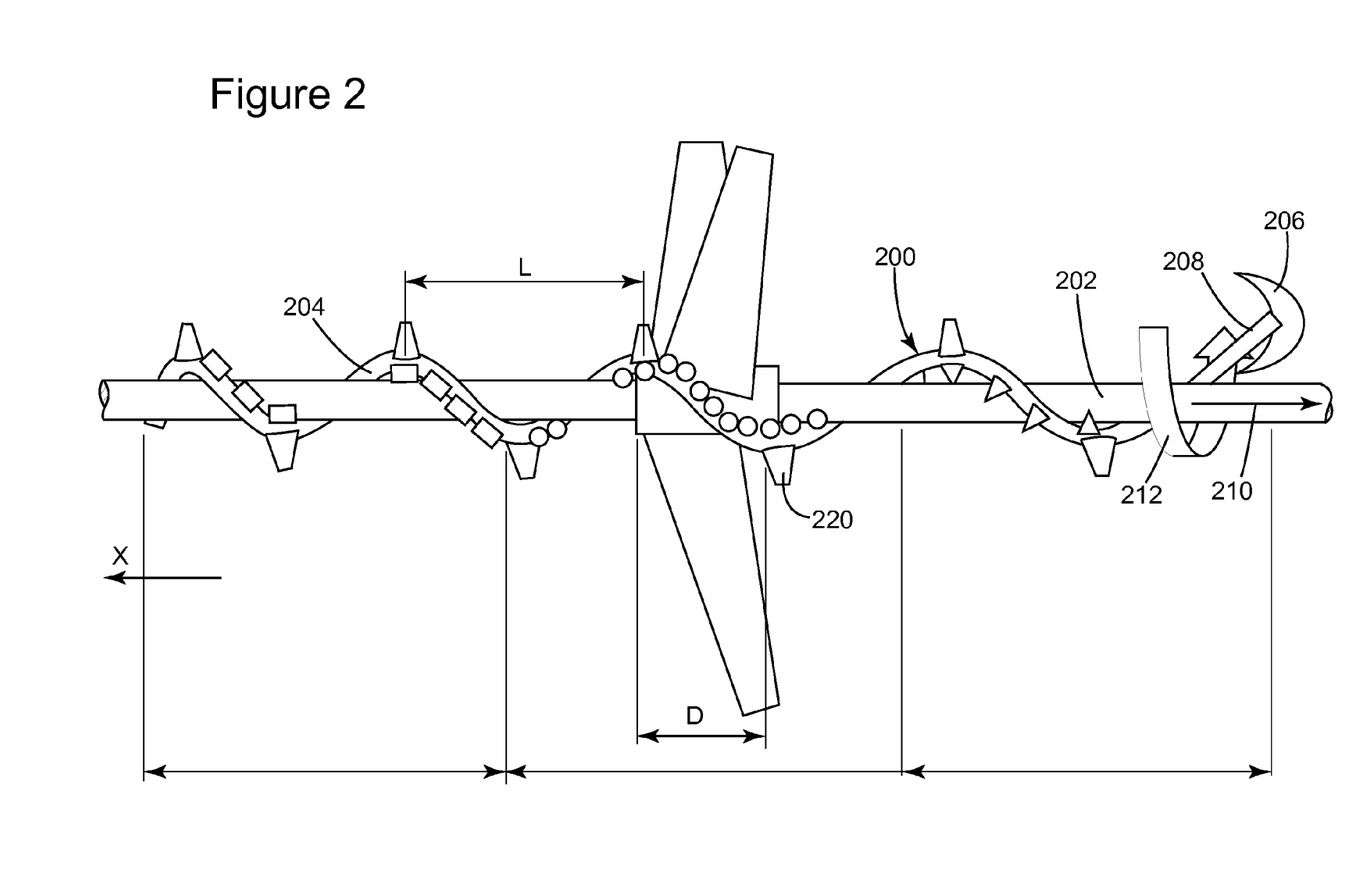
FIG. 2 is a schematic diagram of a conventional cleaning device.

An improved method is disclosed in U.S. Provisional Patent Application Ser. No. 61/657,511 ('511 herein), assigned to the same assignee as the present patent application. FIG. 2, which corresponds to Figure of '511, shows a cleaning device 200 that is deployed over (around) a streamer 202 for providing one or more functions (e.g., cleaning, repairing, etc.) to the streamer. The streamer 202 extends into the water and is towed by a vessel (not shown) along direction X. The cleaning device 200 has a body 204 made of a flexible material, e.g., composite, plastic, metal or a combination thereof. The body 204 has a spiral-type shape and may be wrapped around the streamer 202. The body 204 preferably is able to twist one portion relative to another portion, i.e., it is flexible for reasons to be discussed later. Thus, the body 204 may have a spring shape as shown in FIG. 2 and is capable of compressing or extending depending on the applied forces.

For making the cleaning device 200 advance along the streamer 202 (along direction 210), a movement-generating device 206 is provided at one end 208 of the body 204. The movement-generating device 206 may be an anchor or a surface configured to be acted upon by the water while the streamer is towed with a given velocity so that the cleaning device 200 is drag-propelled while the streamer is towed.

For providing rotational motion to the body 204, or for supplementing the rotational motion, wings 220 may be provided along the body 204. The wings 220 are oriented relative to the body 204 so that due to the motion of the streamer along direction X, the water acts on the wings 220 to rotate them and implicitly the body 204 along the rotational direction 212. The cleaning device 200 may have various elements to provide desired functions, e.g., cleaning, repairing, etc.

However, one or more components of the above described system may become blocked, e.g., when passing a bird, and thus, may fail to achieve the intended use.

Accordingly, it would be desirable to provide systems and methods that avoid the afore-described problems and drawbacks.

SUMMARY

According to one exemplary embodiment, there is a coating and/or cleaning device for cleaning a marine seismic streamer. The device includes a body having an opening configured to receive the marine seismic streamer; an actuator configured to be removably attached to the marine seismic streamer; a rope connecting the body to the actuator; and a control device configured to activate the actuator to retract or release the body. The body is configured to coat the marine seismic streamer with a biocide material.

According to another exemplary embodiment, there is a coating and/or cleaning system for cleaning a marine seismic streamer. The system includes a first coating and/or cleaning device configured to be attached to the marine seismic streamer, between first and second birds; a second coating and/or cleaning device configured to be attached to the marine seismic streamer, between second and third birds; a rope connecting the first coating and/or cleaning device to the second coating and/or cleaning device; and a pulley-type device attached to the marine seismic streamer and configured to handle the rope such that a movement of the first coating and/or cleaning device along a direction of the marine seismic streamer makes the second coating and/or cleaning device to move in an opposite direction of the marine seismic streamer. The system is configured to apply a biocide material on the streamer.

According to still another exemplary embodiment, there is a coating and/or cleaning device for cleaning a marine seismic streamer. The device includes a body having an opening configured to receive the marine seismic streamer; an actuator attached to the body; and a control device configured to activate the actuator to move the along the marine seismic streamer between two consecutive birds. The body is configured to coat the marine seismic streamer with a biocide material.

According to yet another exemplary embodiment, there is a method for coating with a biocide material a streamer. The method includes a step of attaching a coating and/or cleaning device to the streamer; a step of controlling a movement of the coating and/or cleaning device along the streamer; and a step of applying a coat of the biocide material on the streamer when the coating and/or cleaning device moves along the streamer.

BRIEF DESCRIPTION OF THE DRAWINGS

The accompanying drawings, which are incorporated in and constitute a part of the specification, illustrate one or more embodiments and, together with the description, explain these embodiments. It is noted that no dimensions should be inferred from the drawings unless specifically indicated in the specification. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer having one or more obstacles, e.g., birds, and a cleaning and/or coating device that can travel along the streamer between the birds. However, the embodiments to be discussed next are not limited to a streamer, but may be applied to other structures that are exposed to a marine environment.

Reference throughout the specification to "one embodiment" or "an embodiment" means that a particular feature, structure or characteristic described in y connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 3:
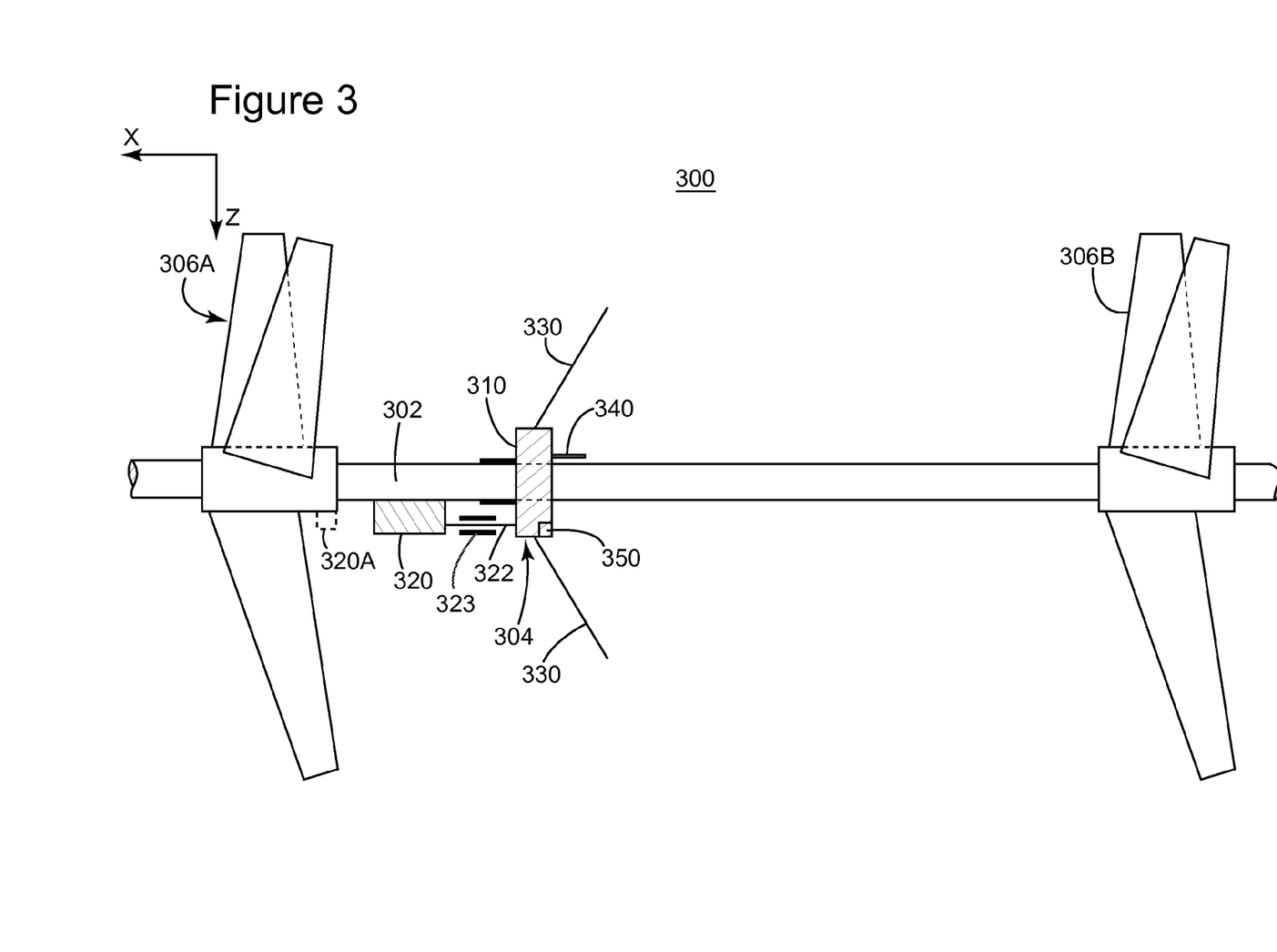
FIG. 3 is a schematic diagram of a coating and/or cleaning device according to an exemplary embodiment.

According to an exemplary embodiment, a streamer and a cleaning and/or coating system 300 is shown in FIG. 3. The system 300 includes the streamer 302 and the cleaning and/or coating device 304. The streamer 302 may be any known streamer in the industry. The streamer 302 may have or not birds. A bird is known in the industry to be a positioning device that has wings or other means (e.g., water pumps) for controlling a position (horizontal and/or vertical) of the streamer while deployed in water. The birds may be clamped to the streamer or have their bodies attached in between sections of the streamer.

FIG. 3 shows a streamer 302 having first and second birds 306A and 306B attached to the streamer. For example, the streamer may be a Sentinel streamer (manufactured by Sercel, located in Nantes, France) and the birds may be Nautilus birds (also manufactured by Sercel).

Figure 4:
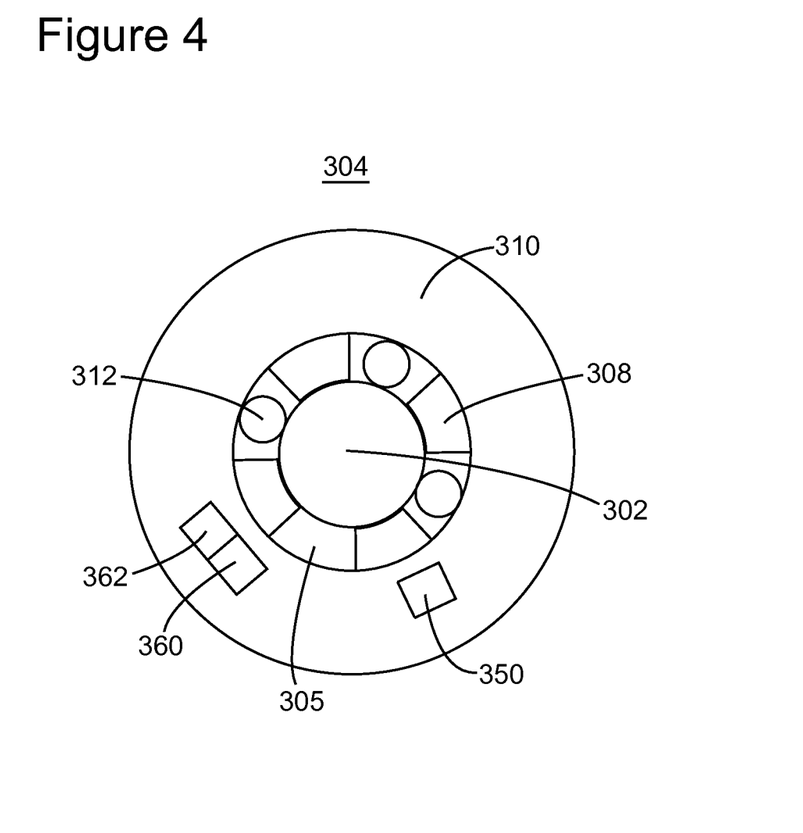
FIG. 4 is a schematic view of a body of a coating and/or cleaning device according to an exemplary embodiment.

The cleaning and/or coating device 304 is configured, as discussed next, to travel both ways between consecutive birds 306A and 306B. The cleaning and/or coating device 304 may have various functions. For example, the cleaning and/or coating device 304 may have a cleaning function, i.e., it may have a component 308 (e.g., a scraper for removing material deposited on the streamer, a brush for coating a material on the streamer, a sweeper, or equivalent part) attached to a body 310 of the cleaning and/or coating device 304, as shown in FIG. 4, for removing and/or cleaning an exterior surface of the streamer. The body 310 may have a ring shape with an opening 305 for receiving the streamer 302. In one application, the body 310 is made of two parts that are attached over the streamer (e.g., using screws, hinges, etc.) The component 308 may be continuous or not around the streamer. The cleaning and/or coating device 304 may also provide a coating function to the streamer. For example, the component 308 may be a brush loaded with a biocide material (e.g., a pesticide, an antimicrobial, etc.) in the form of a gel or a wax. The biocide material 311, after being deposited on the streamer 302 as shown in FIG. 3, removes, kills and/or prevents the marine life (e.g., barnacles) to attach to the streamer. Supplementary biocide material may be stored in the body 310 and supplied to the brush as necessary, for example, while the streamer is towed underwater. Rollers 312 may be provided on the body 310 for improving a motion of the body along the streamer. Other systems may be used instead of the brush for supplying and applying the biocide material to the streamer.

Returning to FIG. 3, the mechanism for making the cleaning and/or coating device 304 travels along the streamer is now discussed. FIG. 3 shows an actuator 320 (e.g., an electric motor that is supplied with electric power from the streamer 302) that is attached to the streamer, behind the first bird 306A. The actuator 320 may be removably fixed to the streamer. Thus, when the streamer is retracted on the vessel, the actuator may be removed before wounding the streamer on a spool on the vessel's deck. Alternatively, the actuator 320 may be directly attached to the bird as shown by reference number 320A.

A rope 322 extends from the actuator 320 to the cleaning and/or coating device 304. The rope 322 may be made of a synthetic material, a natural material, may include cables to transmit data and/or electric power or may be just a cable. In one application, rope 322 may be guided through an enclosure 323. Enclosure 323 may be closed to prevent damage from ocean on the rope. In one application, more than one rope may be connected between the actuator and the cleaning and/or coating device for preventing applying an unbalanced force on one side of the body 310. Alternatively, rollers 312 prevent the application of an unsymmetrical force on the body 310. One or more wings (or other equivalent devices) 330 may be attached to the body 310 for propulsion purposes, as will be discussed later. A switch 340 is also provided on the body 310 and disposed to face the second bird 306B. The switch 340 is used to detect a contact between the device 304 and the second bird 306B and to switch a traveling direction of the cleaning and/or coating device 304. A control device 350 is responsible for receiving the data from the switch 340, switching the travelling direction, coordinating the movement of the wings 330, coordinating the actuator 320, etc. In another embodiment, the control device 350 in coordination with a vessel's central control device (not shown) coordinate the cleaning and/or coating device's movement as discussed later. In still another embodiment, a mechanical system may be implemented for automatizing the switching of the travelling direction. The body 310 may also include a battery 360 for supplying electric power to the control device 350. Alternatively, if electric power is received either from the streamer (e.g., inductive electric power transfer) or from the actuator 320, an interface 362 is provided in the body 310 for managing the power transfer. If the last version is implemented, then the actuator 320 may inductively receive electric power from the streamer and in this case, the rope 322 serves not only to retrieve the cleaning and/or coating device 304 but also to supply the electric power. In still another exemplary embodiment, the rope 322 provides a path (e.g., a cable) for exchanging data between the streamer and/or the actuator and the cleaning and/or coating device. In yet another exemplary embodiment, the cleaning and/or coating device may exchange data directly with the streamer.

Figure 5:
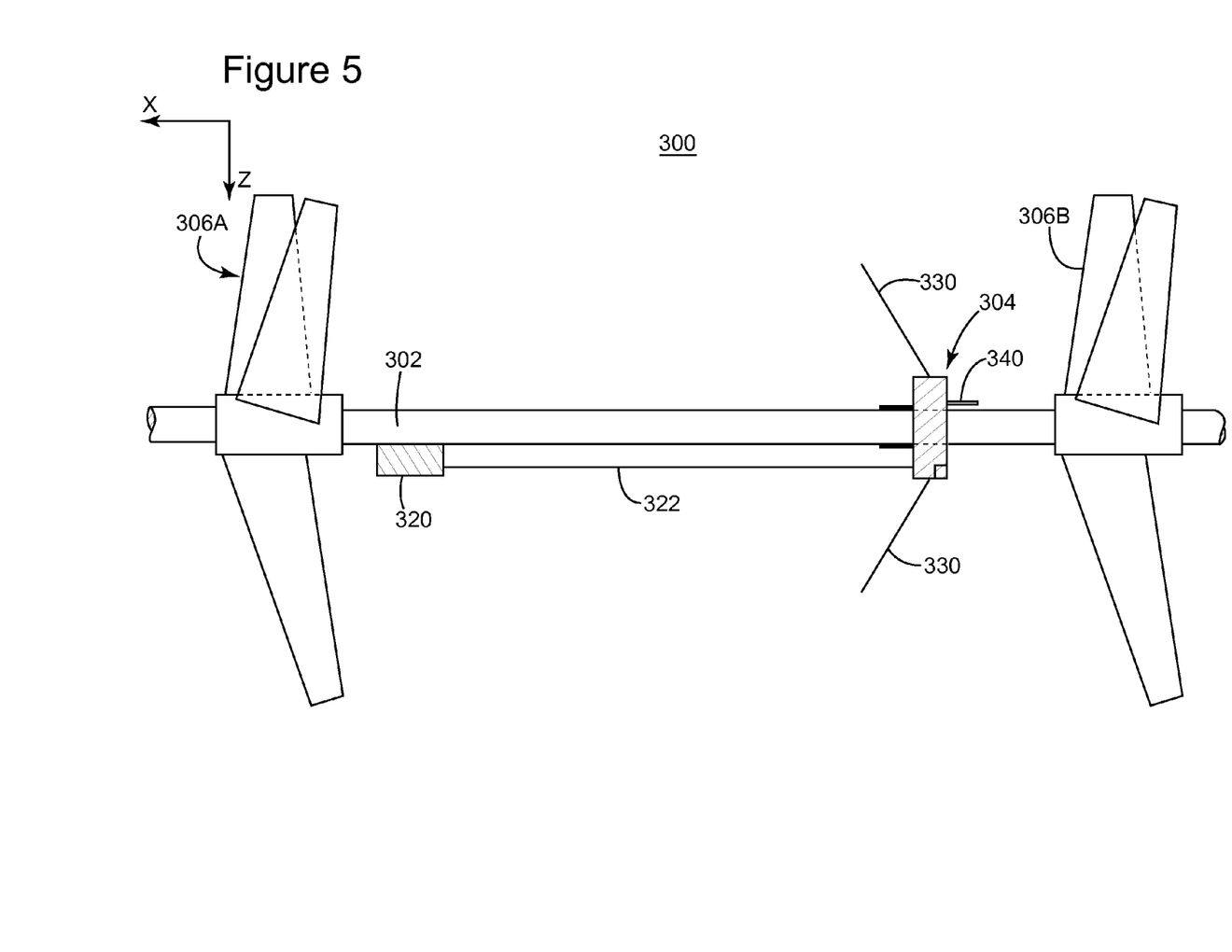
FIG. 5 illustrates how a coating and/or cleaning device moves along a streamer according to an exemplary embodiment.

The functionality of the cleaning and/or coating device 304 is now discussed. Suppose that the streamer travels along the positive direction of the X axis as shown in FIG. 3, and that the cleaning and/or coating device 304 is located next to the first wing 306A. Under these conditions, the control device 350 may instruct the actuator 320 to release the rope 322 so that the cleaning and/or coating device 304 moves in the negative direction of the X axis as shown in FIG. 5. To facilitate this movement, the control device 350 may instruct the wings 330 to deploy as also shown in FIG. 5. This movement of the cleaning and/or coating device 304 continues until the switch 340 contacts the second bird 306B in FIG. 5. At that time, the switch sends a signal to the control device 350 indicative of the proximity of the cleaning and/or coating device 304 to the second bird 306B. Based on this information, the control device 350 may instruct the actuator 320 to retract the rope 322 to bring the cleaning and/or coating device 304 back to the original position, i.e., next to the first bird 306A. The control device 350 also instructs the wings to retract to a folded position when the cleaning and/or coating device is next to the second bird 306B, to reduce the drag. In another application, the control device 350 waits a predetermined time before instructing the actuator 320 to retrieve the rope 322. In still another embodiment, the vessel's control system transmits data to the control device 350 about a timing when to retract or release the rope 322 and/or when to deploy or retract the wings.

Note that when the cleaning and/or coating device 304 travels from the first bird 306A to the second bird 306B, the biocide material may be coated to the streamer. In one application, the biocide material is applied when the cleaning and/or coating device 304 travels from the second bird to the first bird. In still another exemplary embodiment, the biocide material is applied both ways. In yet another exemplary embodiment, the control device 350 or the vessel's control device may instruct the cleaning and/or coating device 304 when to apply the coating. The cleaning function may be implemented in a similar way.

Figure 6:
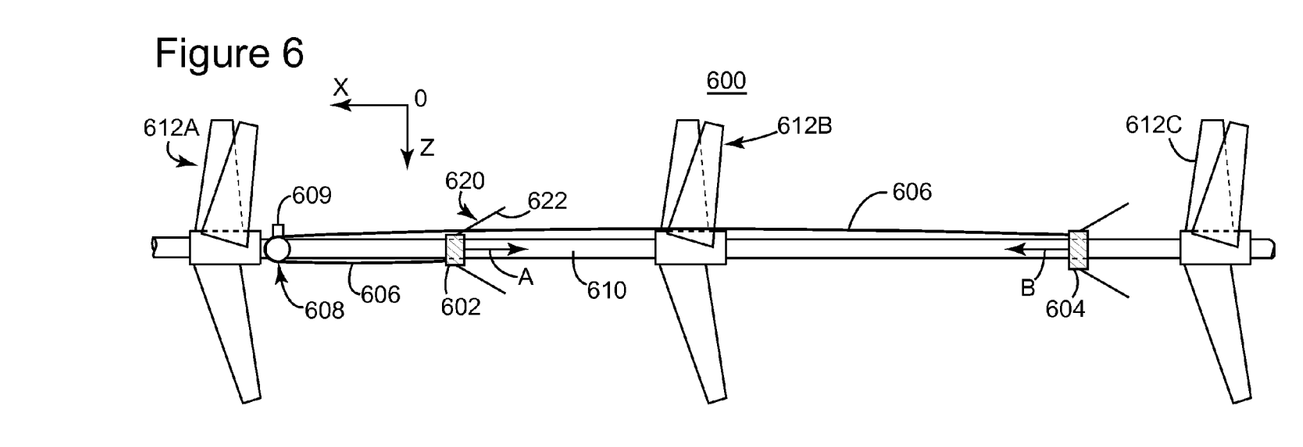
FIGS. 6 and 7 illustrate another coating and/or cleaning device according to an exemplary embodiment.

According to another exemplary embodiment illustrated in FIG. 6, a cleaning and/or coating device may be used without an actuator 320 as shown in FIGS. 3 and 5. In this embodiment, two cleaning and/or coating devices 602 and 604 are mechanically connected to each other through a rope 606. The rope 606, similar to the rope 322 in FIG. 3, may transmit data and/or electric power. The rope 606 may pass through a pulley 608 or equivalent device, which may reduce a friction of the rope 606 with the streamer 610. A length of the rope 606 may be substantially twice a distance between two adjacent birds. The pulley 608 may be removably attached to the streamer 610 or to a bird. Three birds 612A, 612B and 612C are shown in the figure and each of the cleaning and/or coating device is provided between two adjacent birds.

When the streamer is towed along the positive direction of the OX axis, the cleaning and/or coating device 602, which has a variable drag system 620, instructs the wings 622 of the variable drag system 620 to take a position that increases the drag in water. In this way, the cleaning and/or coating device 602 moves in the negative direction of the OX axis (as illustrated by arrow A) while the cleaning and/or coating device 604 moves in the positive direction of the OX axis (as illustrated by arrow B). The pulley 608 may include a brake device 609 for slowing down a rotation of the pulley, to control a speed of the cleaning and/or coating device along the streamer. The brake device 609 may be controlled by the control device to be discussed later.

Figure 7:
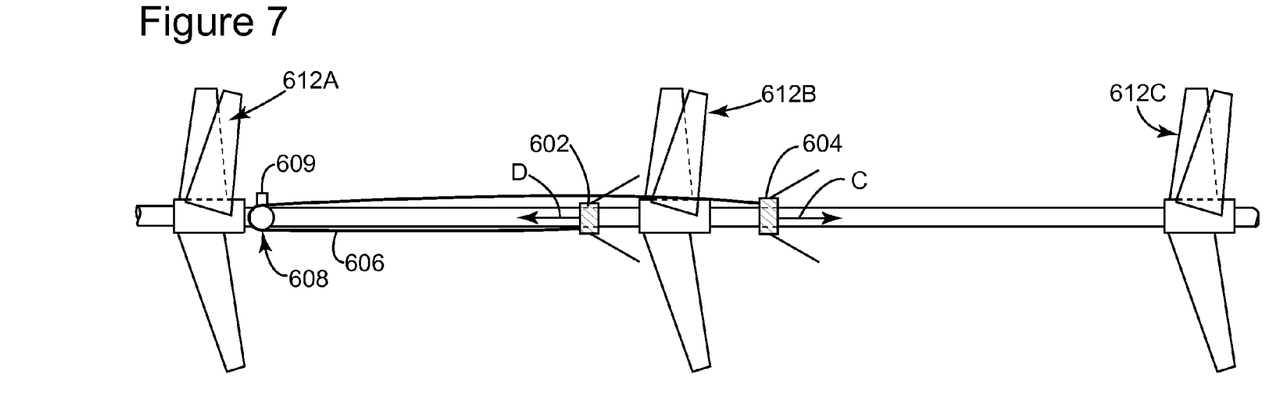

When the cleaning and/or coating device 602 reaches the bird 610B, the switch (not shown but similar to switch 340) informs the control device (not shown but similar to control device 350) that a change in the travelling direction is necessary and thus, the variable drag system 620 of the cleaning and/or coating device 602 reduces its drag, as shown in FIG. 7. The current drag of the cleaning and/or coating device 602 needs to be smaller than the drag of the cleaning and/or coating device 604 so that this last device moves along the negative direction of the OX axis and pulls the device 602 along the positive direction of the OX axis as indicated by arrows C and D in FIG. 7.

Figure 8:
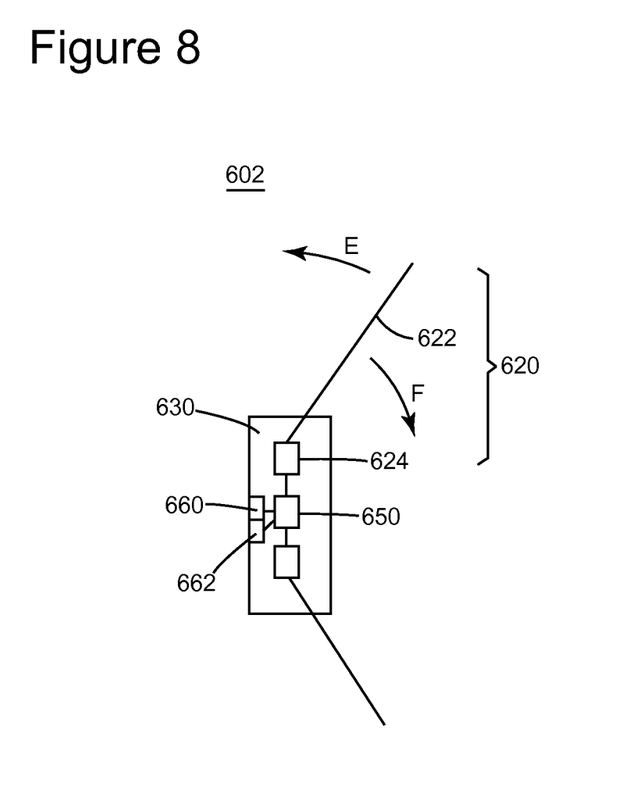
FIG. 8 shows a body of a coating and/or cleaning device according to an exemplary embodiment.

Note that in this arrangement the cleaning and/or coating devices work in pairs and at least one of the devices needs to have the variable drag system 620. In one application, both devices 602 and 604 have the variable drag system 620. The variable drag system 620, as shown in FIG. 8, may be distributed inside the body 630 of the cleaning and/or coating device 602. The variable drag system 620 includes one or more wings 622 and one or more corresponding actuators 624 for moving the wings in a desired direction E or F. The actuator 624 can be entirely mechanical (e.g., springs and levers as known in the art), or electrical (as discussed above) or a combination of both.

The variable drag system 620 may be coordinated by the control device 650. Electric power may be fed to the variable drag system 620 from a battery 660 or through an interface 662 (e.g., from the rope 606, from the streamer 602 or through an inductive process), both of which can be installed on the body 630.

Figure 9:
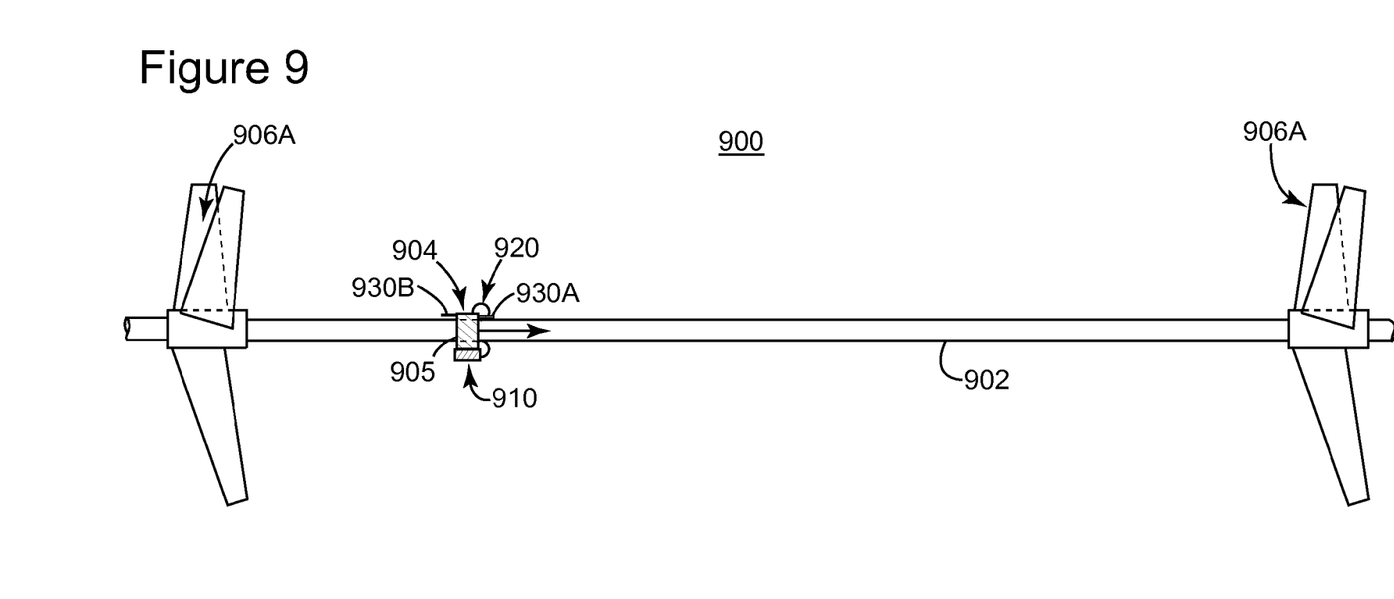
FIG. 9 illustrate yet another coating and/or cleaning device according to an exemplary embodiment.

According to another exemplary embodiment illustrated in FIG. 9, a system 900 includes a streamer 902 and a cleaning and/or coating device 904 that is configured to move back and forth between first and second birds 906A and 906B. In this embodiment, the cleaning and/or coating device 904 has a body 905 on which an actuator 910 (e.g., an electrical motor)

for providing autonomous propulsion is distributed. As in the previous embodiments, the electric power may be provided by a battery or through an inductive interface and the control is managed by a control device (not shown but similar to control device 350 in FIG. 3). The control device may be localized on the cleaning and/or coating device, or distributed on the device and the streamer and/or vessel.

Wheels 920 may be attached to the cleaning and/or coating device 904 to contact the streamer and to advance along the streamer when the actuator 910 actuates them. The wheels 920 may be mounted with a spring force to maintain contact with the streamer. A switch 930A informs the control device when the cleaning and/or coating device 904 has reached the second bird 906B and another switch 930B informs the control device when the device 904 has reached the first bird 906A. As in the previous embodiments, the cleaning and/or coating device does not have to continuously move from one bird to the other bird to coat or clean the streamer. The control device may be programmed with predetermined time delays between consecutive displacements of the cleaning and/or coating device between the birds.

Figure 10:
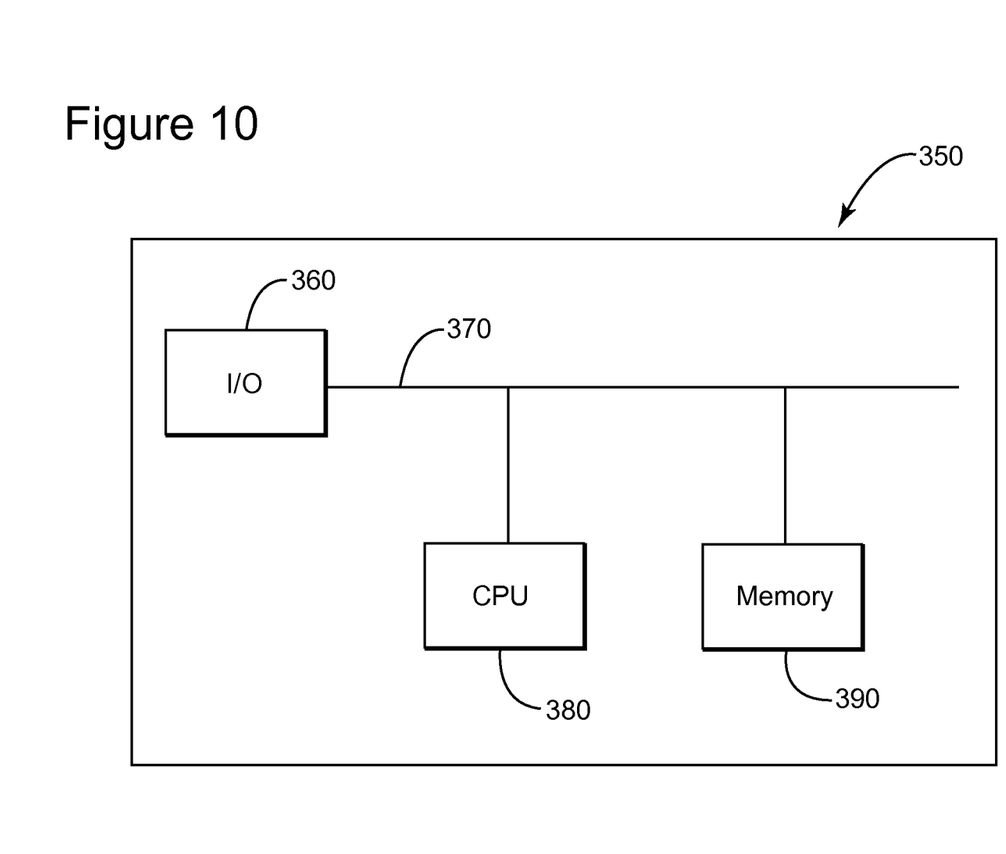
FIG. 10 is a schematic view of a control device according to an exemplary embodiment.

An exemplary control device is illustrated in FIG. 10. The control device 350 includes an input/output interface 360 that is connected through a bus 370 to processor 380 and a memory 390. The processor 380 may read from the memory 390 or from data received through the interface 360 data from the vessel, the various switches and/or the wings. Based on this data, the processor 380 is programmed to change a movement direction of the device, or to modify the position of the wings, or to determine when to activate the device. Optionally, the processor 380 may be programmed to determine how much biocide material to apply to the streamer.

Figure 11:
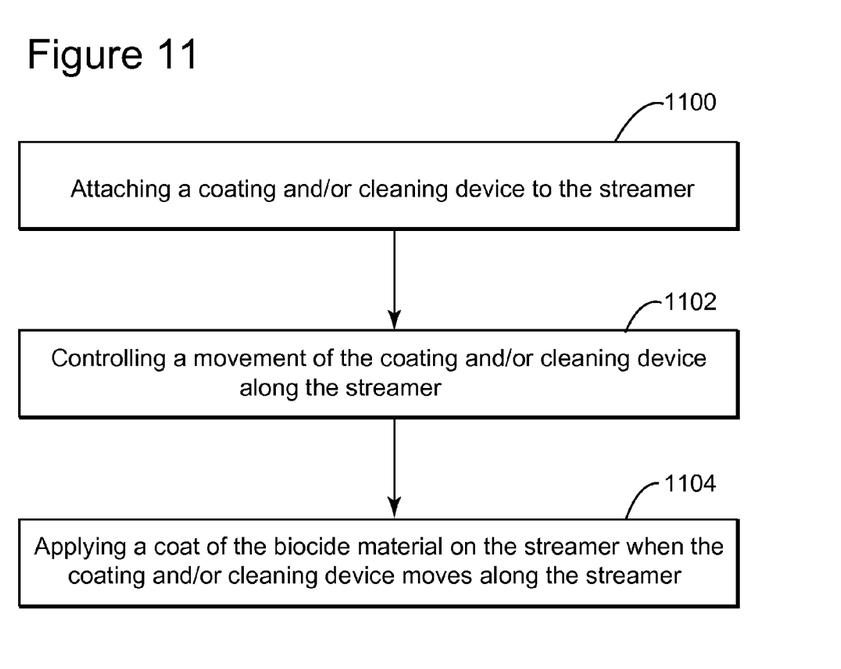
FIG. 11 is a flowchart of a method for applying a coating to a streamer while underwater.

A method for coating with biocide material a streamer is now described with regard to FIG. 11. The method includes a step 1100 of attaching a coating and/or cleaning device to the streamer, a step 1102 of controlling a movement of the coating and/or cleaning device along the streamer, and a step 1104 of applying a coat of the biocide material on the streamer when the coating and/or cleaning device moves along the streamer. Any of the devices described in the previous embodiments may be used for this method.

For improving the cleaning and/or coating functions, the cleaning and/or coating device may be configured to rotate (partially or totally) relative to the streamer. The rotation of the cleaning device is achieved with additional wings. For the embodiments illustrated in FIGS. 3, 5, 6, and 7, the cleaning and/or coating device does not need to fully rotate around the streamer. It may be enough for these devices to rotate by a couple of degrees, e.g., less than 90°, while traveling along the streamer. Thus, the cleaning and/or coating device may simultaneously rotate relative to the streamer and advance along the X axis relative to the streamer. The combined rotation and translation of the device relative to the streamer is useful for cleaning and/or coating. In one application, the cleaning and/or coating device may be used to regularly clean the streamer when barnacles are microscopic and combine the cleaning with an antifouling application, e.g., like toothpaste, to have a preventive action with a fresh coating. The cleaning and/or coating device may be used not only with a streamer but with any seismic equipment that is towed in water.

The disclosed exemplary embodiments provide a device and a method for coating and/or cleaning a streamer. It should be understood that this description is not intended to limit the invention. On the contrary, the exemplary embodiments are intended to cover alternatives, modifications and equivalents, which are included in the spirit and scope of the invention as defined by the appended claims. For example, a claim including a streamer and a cleaning and/or coating device is envisioned to be supported by this document. Also, a claim including a vessel towing a streamer and a cleaning and/or coating device is envisioned to be supported by this document. Further, a claim disclosing a vessel towing a source that emits acoustic waves and also towing a streamer that has a cleaning and/or coating device is believed to be disclosed by this document.

Figure 12:
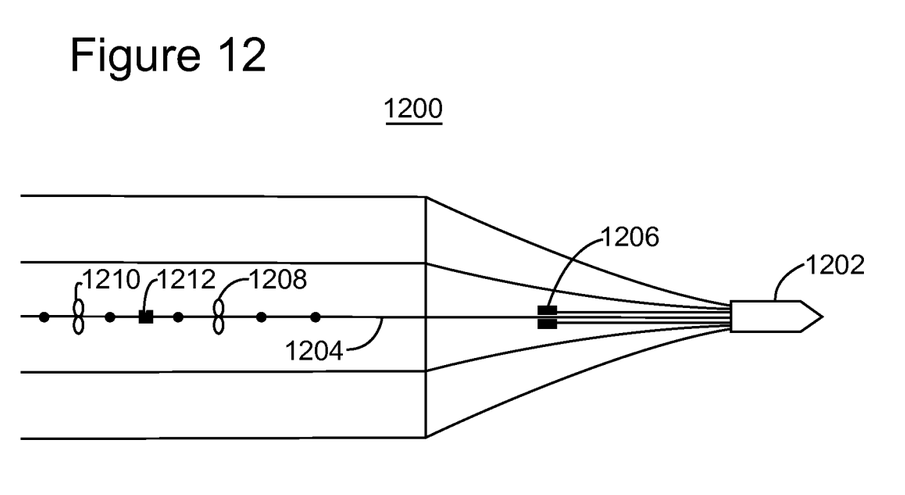
FIG. 12 is a schematic view of a seismic survey acquisition system that uses a cleaning and/or coating device according to an embodiment.

For example, FIG. 12 shows an acquisition system 1200 that includes a vessel 1202 towing plural streamers 1204 and one or more seismic source arrays 1206. Streamer 1204 includes plural seismic sensors 1208 for recording the seismic data originated by source array 1206. Streamer 1204 also may include a positioning device 1210 (e.g., bird) and a cleaning and/or coating device 1212 as discussed above. The cleaning device 1212 may move between consecutive positioning devices 1210 while the seismic sensors 1204 record seismic data. In one application, seismic sources 1206 are shoot while the cleaning and/or coating device 1212 cleans the streamer.

Furthermore, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cleaning system for cleaning a marine seismic equipment, the system comprising:
   a first cleaning device comprising a body having an opening configured to be moveably attached to the marine seismic equipment, between first and second birds;
   a second cleaning device comprising a body having an opening configured to be moveably attached to the marine seismic equipment, between second and third birds;
   a rope connecting the first cleaning device to the second cleaning device; and
   a pulley attached to the marine seismic equipment and configured to handle the rope such that a movement of the first cleaning device along a direction of the marine seismic equipment makes the second cleaning device move in an opposite direction of the marine seismic equipment,
   wherein the system is configured to clean the equipment.

2. The system of claim 1, wherein a length of the rope is substantially twice a distance between two adjacent birds distributed along the equipment.

3. The system of claim 1, further comprising:
   a brake configured for controlling a speed of the rope.

4. The system of claim 1, wherein one of the first or second cleaning devices comprises:

a wing attached to the body;

an actuator provided in the body and connected to the wing to change a position of the wing;

a switch configured to contact one of the first, second and third birds; and a control device configured to control the actuator based on a signal received from the switch.

5. The system of claim 1, wherein one of the first and second cleaning devices further comprises:

a brush attached to the body for coating the biocide material on the marine seismic equipment.

6. The system of claim 1, wherein one of the first and second cleaning devices further comprises:

a scrapper, brush, or sweeper attached to the body for removing material deposited on the marine seismic equipment.

7. The system of claim 1, wherein each of the first and second cleaning devices comprises:

at least one wing for producing drag while underwater, wherein the bodies of the first and second cleaning devices are each configured to be provided completely around the marine seismic equipment.

\* \* \* \* \*